(12) United States Patent
Berstis (10) Patent No.: US 7,173,659 B2
(45) Date of Patent: Feb. 6, 2007

(54) SYSTEM AND METHOD FOR ANTI-MOIRE IMAGING

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/015,492

(22) Filed: Dec. 13, 2001

(65) Prior Publication Data

US 2003/0112349 A1 Jun. 19, 2003

(51) Int. Cl.
*H04N 3/14* (2006.01)
*G06K 9/32* (2006.01)

(52) U.S. Cl. ...................... 348/294; 382/300
(58) Field of Classification Search ........ 382/298–300; 348/230.1, 229.1, 236, 237, 294
See application file for complete search history.

(56) References Cited

U.S. PATENT DOCUMENTS

| | | | |
|---|---|---|---|
| 4,574,311 A * | 3/1986 | Resnikoff et al. | 348/315 |
| 5,648,649 A | 7/1997 | Bridgelall et al. | 235/462.36 |
| 5,818,977 A * | 10/1998 | Tansley | 382/294 |
| 5,946,452 A | 8/1999 | Spaulding et al. | 358/1.9 |
| 5,987,219 A | 11/1999 | Naylor, Jr. et al. | 358/1.9 |
| 6,152,372 A | 11/2000 | Colley et al. | 235/472.01 |
| 6,285,799 B1 | 9/2001 | Dance et al. | 382/261 |

OTHER PUBLICATIONS

Balph, Tom, LFSR counters implement binary polynomial generators, May 21, 1998, EDN, http://edn.com/archives/1998/052198/11df_06.htm.*
Texas Instruments, "What's an LFSR?", 1996, http://focus.ti.com/lit/an/scta036a/scta036a.pdf.*
Sung, R., Sung, A., Chan, P., Mah, J., "Linear Feedback Shift Register", http://www.ee.ualberta.ca/~elliot/ee552/studentAppNotes/1999f/Drivers_Ed/lfsr.html.*
"Minimize Moire' Pattern (scanning)", published by Digital Design and Imaging, downloaded from http://www.godigital-design.com/tips_moire'.htm Nov. 12, 2001.

* cited by examiner

*Primary Examiner*—Bhavesh M. Mehta
*Assistant Examiner*—Sath V. Perungavoor
(74) *Attorney, Agent, or Firm*—Robert H. Frantz; David A. Mims, Jr.

(57) ABSTRACT

A two-dimensional sensor array of non-uniformly spaced sensors for using in digitizing images and avoiding moiré patterns within those images. The non-uniform distribution of the sensors allows the array to avoid having an inherent "frequency" that may interfere with details or harmonics present in the image source, thereby eliminating or reducing the occurrence of moiré patterns and the need for application of image processing to remove moiré patterns.

19 Claims, 7 Drawing Sheets

*Prior Art*

Figure 1

*Prior Art*

SYSTEM AND METHOD FOR ANTI-MOIRE IMAGING

CROSS-REFERENCE TO RELATED APPLICATIONS (CLAIMING BENEFIT UNDER 355 U.S.C. 120)

This invention is related to U.S. patent application Ser. No. 10/015,880, filed by Viktors Berstis on Dec. 13, 2001, both of which are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related patent application, U.S. patent application Ser. No. 10/015,880, filed by Viktors Berstis on Dec. 13, 2001, is hereby incorporated by reference in its entirety, including figures.

BACKGROUND OF THE INVENTION

1. Field of the Invention

This invention relates to the arts of imaging and image processing, including sensor design and moiré reduction technologies.

2. Background of the Invention

Well-known imaging technologies include film (e.g. analog), digital, and analog-digital hybrid approaches. Film imaging processes use a set of lenses to focus an image onto a film sheet which is impregnated with grains of material reactive to the spectrum to be recorded, such as visible light, infrared ("IR"), or X-ray. The grains are randomly arranged in each sheet of film, and thus reproduction of the image on the developed film has a certain resolution based on the size and density of these grains.

Figure 1:
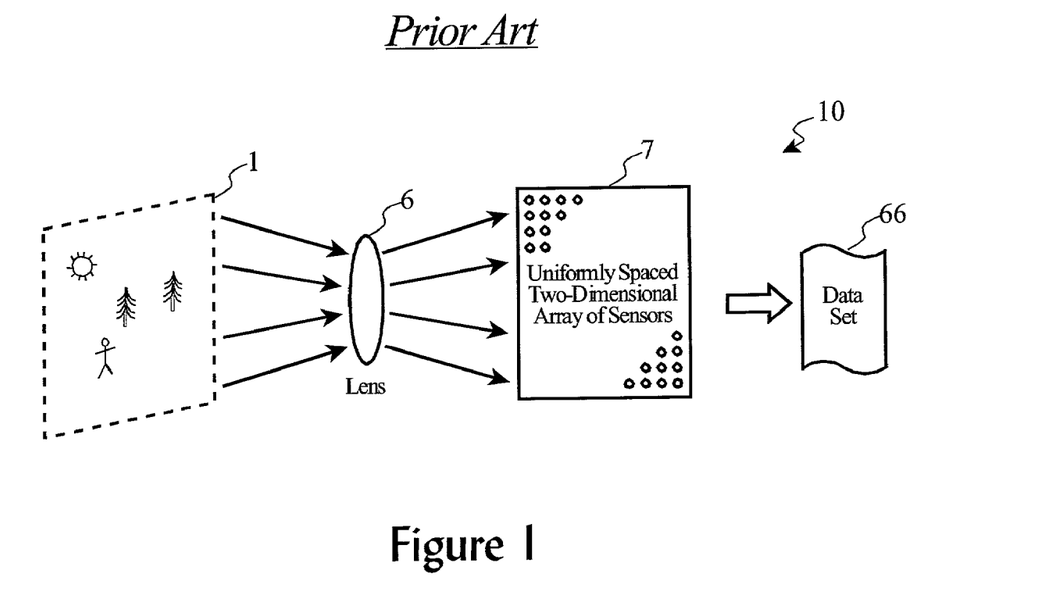
FIG. 1 illustrates the arrangement of components of an imaging system which employs a two-dimensional sensor array, such as a digital camera.

In digital imaging, a sensor of uniformly-arranged sensing elements is used to capture "bits" or pixels of the image. Turning to FIG. 1, the system components (10) of a typical digital camera are shown. In this example, a scene or original item (1) is digitally imaged using a two-dimensional array (7) of sensors such as an array of charge-coupled devices ("CCD"). The image of the scene is focused onto the array (7) by a lens (6), and a shutter (not shown) may be used to provided a specific duration of exposure. The sensor elements are arranged with uniform spacing into rows and columns.

Figure 2:
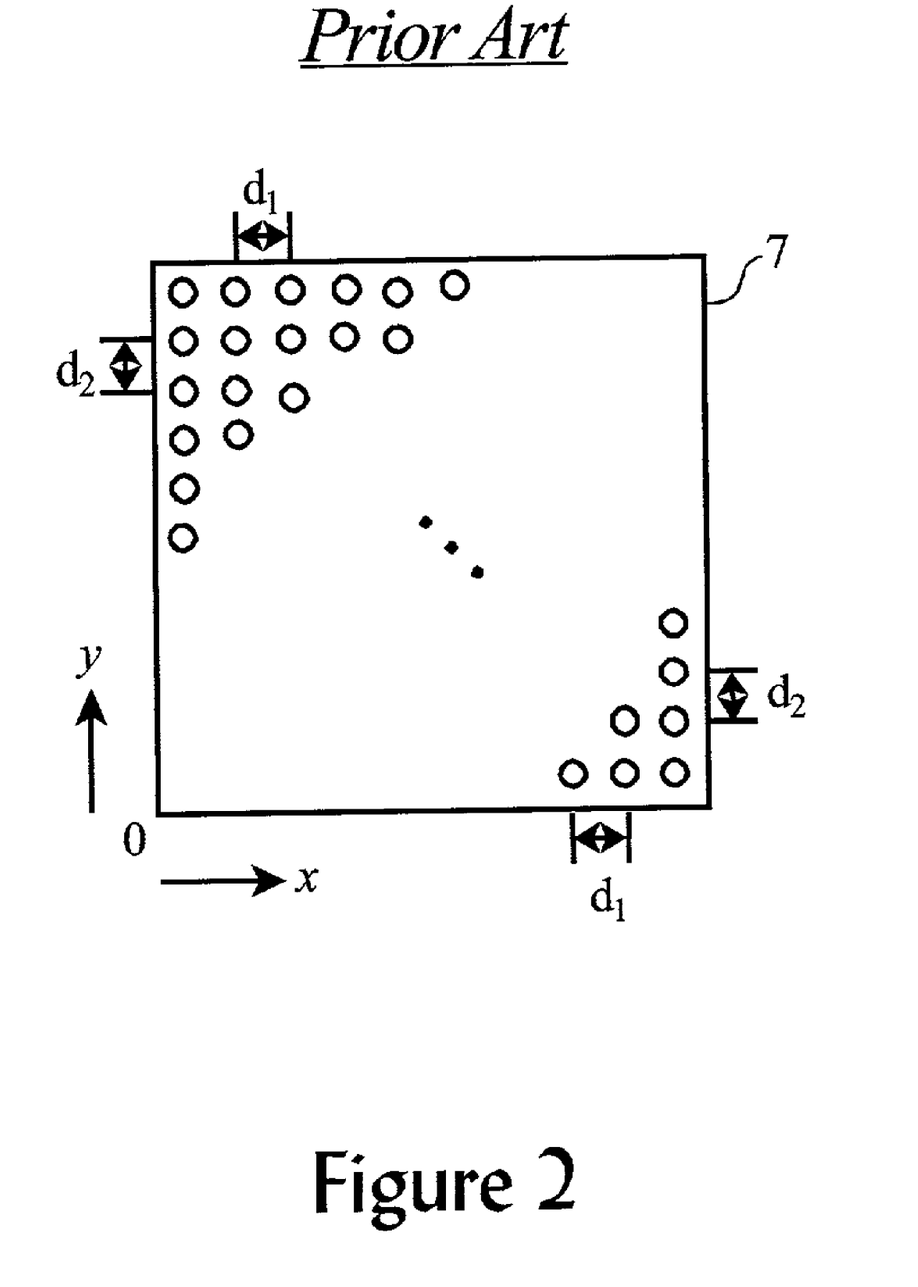
FIG. 2 shows details of a two-dimensional sensor array.

Turning to FIG. 2, more details of a typical two-dimensional sensor array (7) are shown. The sensor element columns are uniformly spaced at distance $d_1$ from each other according to a linear function such as:

x-axis position of sensor in column $n = P_n = (n-1) \cdot d_1$ where the array is comprised of N sensor columns, n is the column number ranging from 1 through N, and $d_1$ is the uniform distance between the sensor columns.

Likewise, the sensor element rows are uniformly spaced at distance $d_2$ from each other according to a linear function such as:

y-axis position of sensor in column $m = P_m = (m-1) \cdot d_2$ where the array is comprised of M sensor rows, m is the row number ranging from 1 through M, and $d_2$ is the uniform distance between the sensor rows.

In many two-dimensional sensor arrays, the row-to-row spacing $d_1$ may be equal to the column-to-column spacing $d_2$. The number of columns N may be equal to the number of columns M, as well.

The sensors may in practice be reactive to any range of electromagnetic ("EM") spectrum according to the desired application, such as charge-coupled devices ("CCD") for visible or IR imaging.

Typically, the voltage level on each sensor element is measured and converted (e.g. sampled) to a digital value using an analog-to-digital converter. The sample value is relative to the amount of electromagnetic energy incident on the sensor element. Conversion to digital values are typically performed using an analog-to-digital converter having sufficient resolution (e.g. data width) for the intended application. The digital data set (66) of samples represents a digitized or pixelated copy of the image.

Additionally, mechanical and/or chemical filtering and band separation of the EM spectrum may be performed to produce "separated" data sets, such as use of a color wheel in front of the sensor array, or placement of color filters over the sensor elements themselves.

Moiré patterns are artifacts of certain imaging processes which are perceptible to the human eye, but do not represent actual features or details in the original item imaged. They often resemble crosshatch halftones across all or a portion of a digital image.

For imaging processes in which the original is an analog image, for example a photographic subject, moiré patterns may appear when certain features align with the sensors in the sensor array. For example, a digital photograph of a bug screen on a window often produces noticeable moiré patterns due to the bug screen's uniform grid-like features. The resulting apparent pattern is actually an interference pattern between the physical spacing of features of the original image and the spacing of the sensor array.

Just as in the phenomena of interference patterns between other types of signals, visual moiré patterns may become apparent at "harmonics" or integral multiples of spacing distances of the original image features and the spacing distances of the sensor array. For example, if the repeating features of a photographic subject are focussed onto two-dimensional sensor array having a sensor spacing of 600 dots per inch ("DPI") and a moiré pattern forms, then the same image focused at the same distance on a sensor array having a sensor spacing of 1200 DPI will likely result in the appearance of moiré patterns. Undersampling the image at 300 DPI would also likely result in the appearance of moiré patterns.

Many techniques have been developed to try to reduce moiré patterns which appear in existing digital images, such as application of image processing techniques including Gaussian blurring, "descreening" algorithms, and "despeckle" processes. Most of these have a result of reducing the sharpness of the overall image because they reduce the moiré pattern by spreading energy or brightness from a given pixel to adjacent pixels.

Figure 3A:
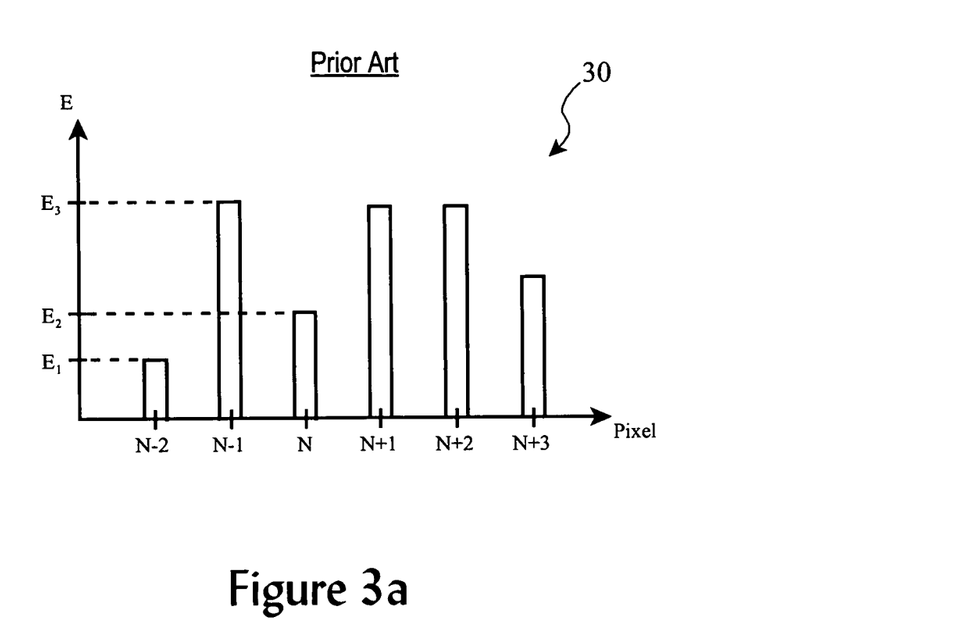
FIGS. 3a and 3b provide illustration of blurring processes often used to reduce the appearance of moiré patterns in digital images.
Figure 3B:
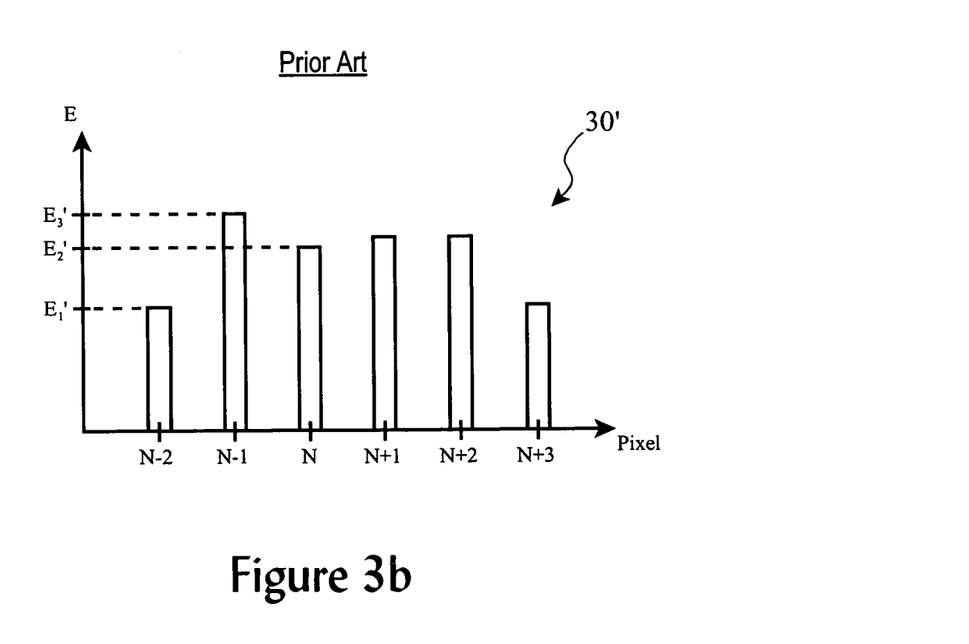

For example, turning to FIG. 3a, pixel N represents a pixel of a moiré pattern in a single row or column, and in this case, a pattern which is darker than the surrounding pixels, N−1 and N+1. The energy $E_2$ of pixel N is lower than the energy $E_3$ of the adjacent pixels N+1 and N−1. A blurring process applies a partial or weighted averaging among regional or adjacent pixels, such as shown in FIG. 3b, wherein the energy of the pixel in the moiré pattern is slightly increased to $E_2'$, and the energy of the adjacent pixels are slightly decreased to $E_3'$.

While this oftentimes decreases the obviousness or appearance of the moiré pattern to the human observer, it also reduces the "sharpness" or level of apparent detail of the entire image. If the blurring process is applied manually on a regional basis, the degradation to the entire image may be avoided, but the local areas are still degraded and substantial human intervention may be required to do so. Additionally, "edge effects" may become perceptible where the region of processing meets a region of unprocessed image.

So, to date, most digital image post-processing attempts to reduce moiré patterns either result in image degradation, require substantial human operator effort, or both to some degree.

Figure 4:
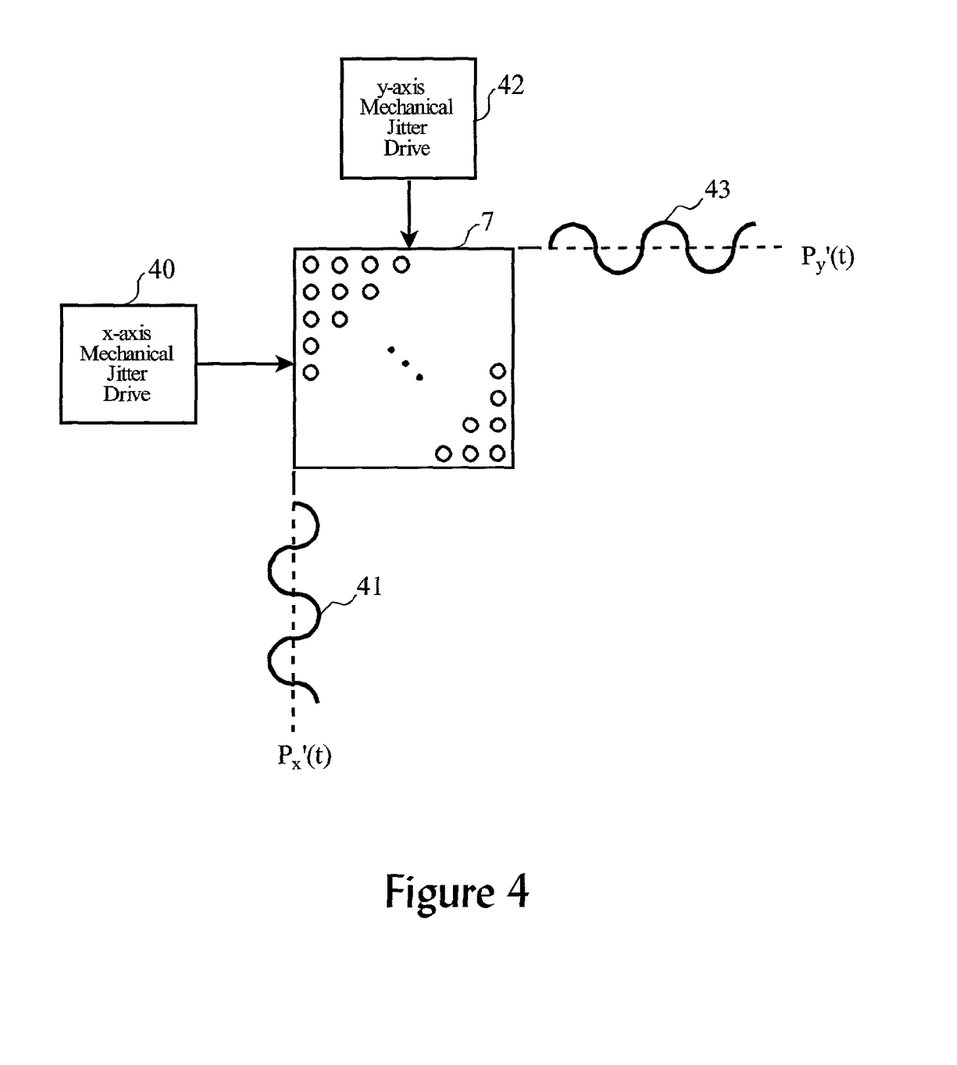
FIG. 4 shows the mechanical dithering action on a typical two-dimensional sensor array.

A common technique employed to avoid the generation of moiré patterns in the imaging process is to dither the sensor array such that the array is moved in physical position with respect to the original subject being imaged. In FIG. 4, such a dithering imaging system with a two-dimensional sensor array (7) is shown. An x-axis mechanical jitter drive (40) is coupled to the array (7) such that it's x-axis position is varied slightly over time, usually in a sinusoidal or triangular pattern (41). Likewise, a y-axis jitter drive (42) may jitter the array in an orthogonal direction, also typically in a sinusoidal or triangular patter (43).

This jittering action allows the array (7) to scan a pattern of points which are not simply an array of uniformly spaced rows and columns, but which represent positions relative to the dithering functions $P_x'(t)$ and $P_y'(t)$. As such, fewer original image sources will have an interference pattern with the dithered sensor pattern, but it is still possible that portions of the original image source may interfere with the dithered sensor pattern to cause localized moiré patterns. Additionally, such dithering mechanisms tend to add expense and failure rate to an assembly such as a digital camera.

Therefore, there is a need in the art for a system and method which avoids generation of moiré patterns in digital images created with a two-dimensional sensor array, without the use of mechanical dithering mechanisms, intensive image post-processing technologies, or a high degree of human operator manipulation and editing. Further, there is a need in the art for this new system and method to maintain image quality, while being readily realizable using current sensor technology, and to preferably be compatible with widely-used image compression and decompression technologies such as bitmap, JPEG (joint photographic experts) and MPEG image products.

BRIEF DESCRIPTION OF THE DRAWINGS

The following detailed description when taken in conjunction with the figures presented herein provide a complete disclosure of the invention.

SUMMARY OF THE INVENTION

The present invention provides a means for avoiding moiré patterns in digitized images by employing a two-dimensional sensor array of non-uniformly spaced sensors. This allows the spacing of the sensors to avoid having an inherent "frequency" that may interfere with details or harmonics present in the image source, which eliminates the occurrence of moiré patterns and the need for application of image processing to remove moiré patterns.

The sensors are placed along each axis in a non-uniform manner according to a predetermined scheme or function. During imaging, sensors are sampled and stored into a data set which represents non-uniformly spaced image points within the original image, scene or subject. Finally, linear interpolation is preferably applied to the non-uniformly spaced data set to yield a synthesized uniformly-spaced data set for use in common imaging formats and processing, such as JPEG or MPEG compression and decompression.

DETAILED DESCRIPTION OF THE INVENTION

The present invention is realized first by fabricating a two-dimensional array of sensor elements wherein the rows and columns of the array have non-uniform spacing according to a predetermined function. The sensors may be any useful type of sensor appropriate for the desired application, such as visible light or IR sensors (CCD), or other types of sensors.

Figure 5:
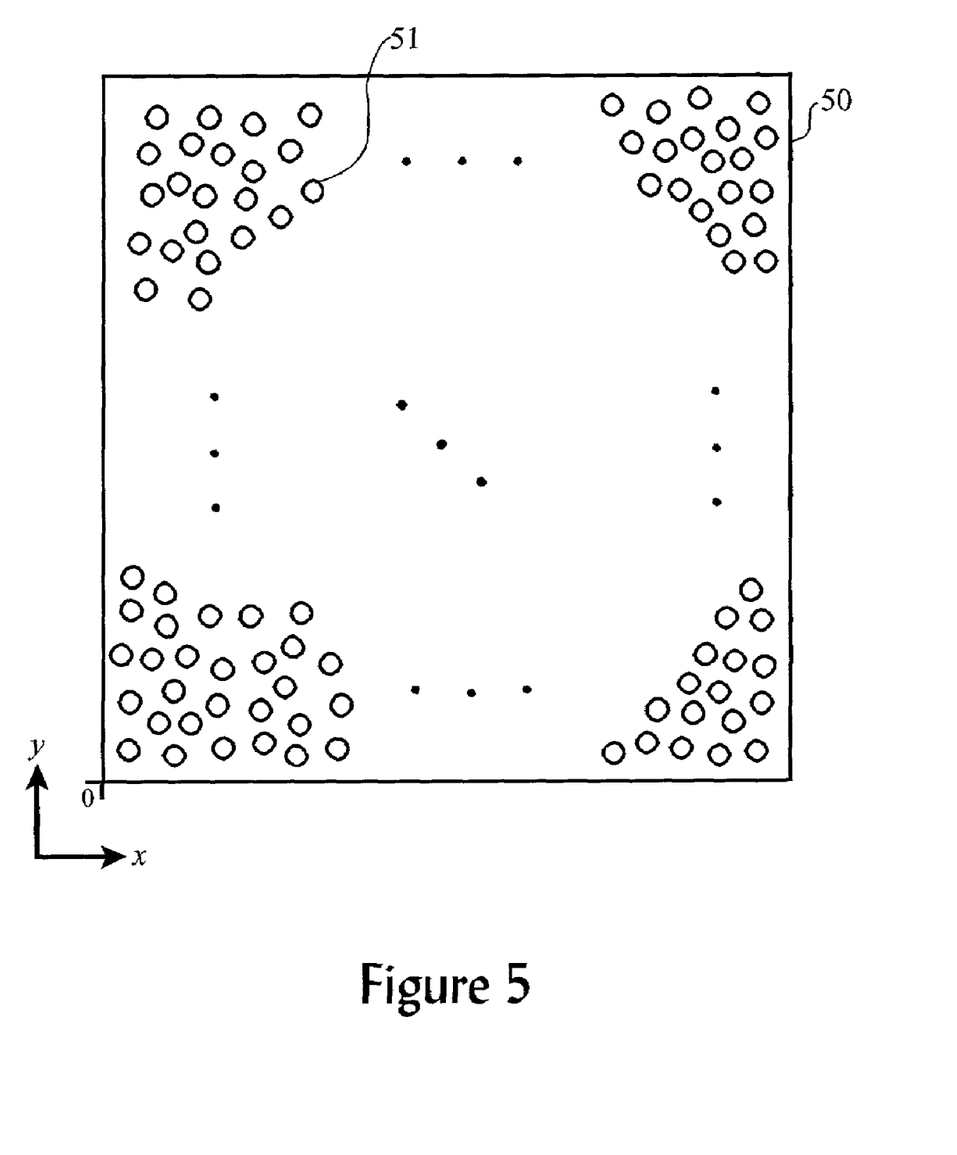
FIG. 5 illustrates the sensor placement for a two-dimensional sensor array according to the invention.
Figure 6:
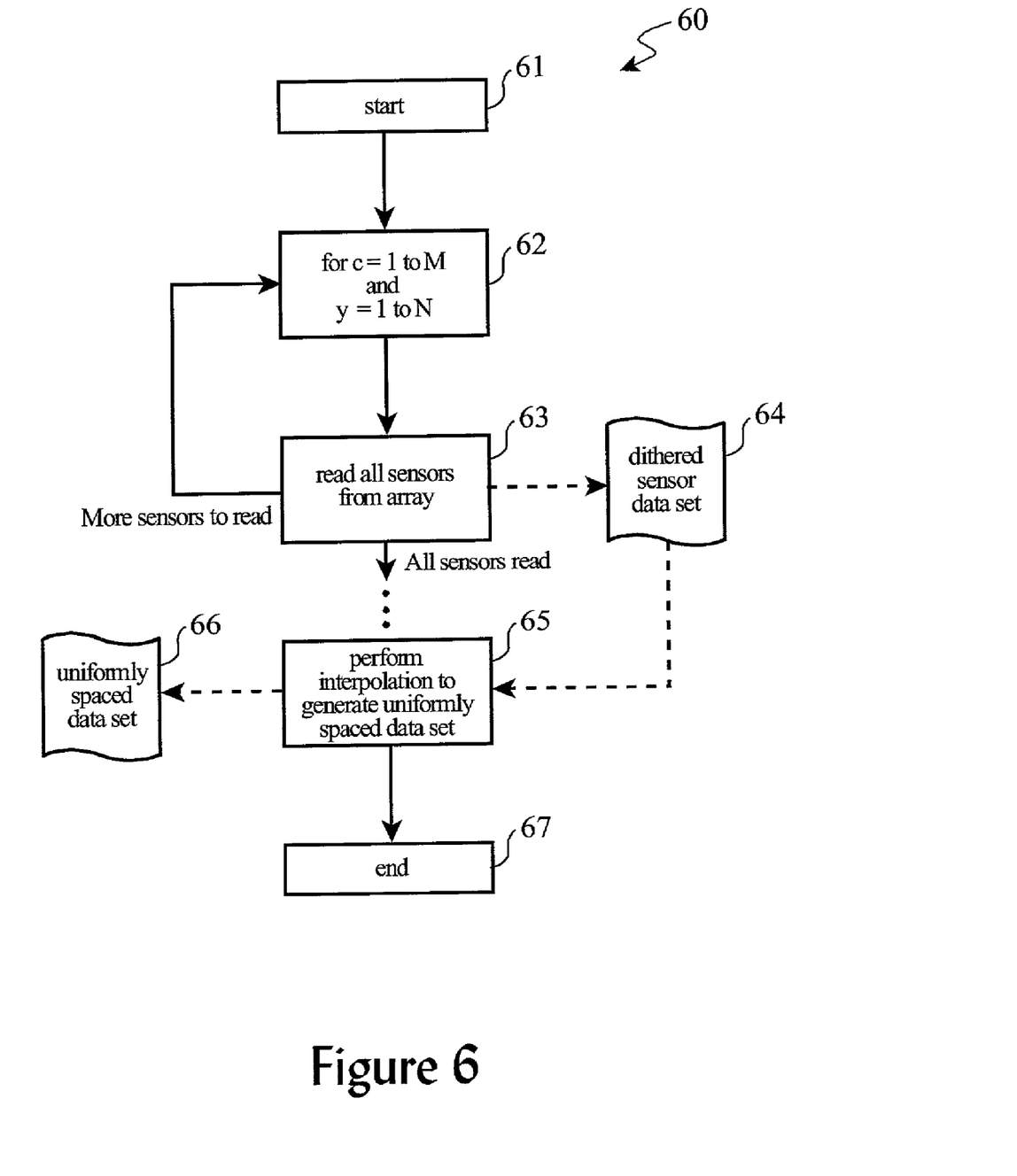
FIG. 6 sets forth the logical process of the invention to yield a data set representing uniformly-spaced sample points from the non-uniformly spaced sensor set according to the present invention.

Turning to FIG. 5, the arrangement of sensors in a two-dimensional array according to the present invention is shown. The spacing between adjacent sensors in the x and y axes are non-uniform, which avoids the physical creation of a "frequency" in the sampling operation.

For example, where c is the column number of a sensor in a given row r, $d_{c=1}$ is not equal to $d_{c=2}$, and $d_{c=2}$ is not equal to $d_{c=3}$, and so forth. Further, these distances should not be harmonic multiples of each other, such as having $d_{c=1}=(\frac{1}{2})d_{c=2}$ and $d_{c=2}=(\frac{1}{4})d_{c=}3$, etc. As such, the function used to determine the sensor-to-sensor spacing of the sensors within a row (e.g. the column-to-column spacing in the x-axis) of the two-dimensional array can be generally expressed as:

Position of sensor at column $c = c \cdot P_{col\_std} + F_x(n)$ as well as the sensor-to-sensor spacing within a column (e.g. the row-to-row spacing in the y-axis):

Position of sensor at row $r = r \cdot P_{row\_std} + F_y(n)$ where $P_{col\_std}$ is the standard or uniform spacing between columns of sensors, $P_{row\_std}$ is the standard or uniform spacing between columns of sensors, n is the number of the pixel in the array (e.g. n=(c−1)+r), and $F_x$ and $F_y$ are functions which provide x-axis and y-axis position offset values in a non-uniform manner.

For example, $F_x$ and $F_y$ may be a short, predictable pseudo-random number patterns or sequences, nonlinear mathematical functions which have broad spectral or harmonic content (e.g. ramp or sawtooth functions), or predictable processes such as cyclic redundancy check ("CRC") polynomials.

According to the preferred embodiment, a CRC process is used to generate the pseudo-random position offset values, as this avoids the need for large look up tables and only requires three parameters to "seed" the determination of all the offset values. While the intermediate results of a CRC process produce a sequence of numbers which are pseudo-random in nature (e.g. non-uniform), CRC processes are entirely predictable in that when they are performed over the same set of data, they yield exactly the same set of intermediate values.

Therefore, a predictable and repeatable number generator can be implemented by seeding a CRC process with an initial CRC value, and then recirculating the data through the algorithm for n iterations, each iteration of the process generating an intermediate value which can be converted into an offset value for sensor position n. Then, to recreate the sequence of offset values for a given array, the process must only be provided the CRC XOR polynomial, the "seed" value, and the conversion method for extracting an offset value from the CRC value at each iteration.

Table 1 shows the pseudocode for such a CRC process, in which an initial CRC value is used to start the process. Then, in each iteration of the offset determination, the current value of the CRC is exclusive-OR'ed on a bitwise basis with a polynomial, and an offset value is extracted from the modified CRC.

This offset value for the $n^{th}$ iteration is the offset value for the $n^{th}$ sensor, where n=(c−1)+r. The offset value is preferably extracted from the CRC value by taking certain bits from the CRC value (e.g. $b_6$, $b_4$, $b_3$, and $b_1$ of an 8-bit CRC), and concatenating them to yield an offset value in binary format. Then, this offset value can be scaled to range within an acceptable physical offset deviation in either axis.

Next, the modified CRC value is barrel shifted left (e.g. shifted to the left whereby the most significant bit is moved to the least significant bit) until a "1" is obtained in the least significant bit of the CRC. This shifted version of the CRC because the CRC value to be XOR'ed in the next iteration for pixel n+1.

TABLE 1

Example CRC Pseudo Random Number Generator Process

CRC = seed_value
For pixel = 1 to N
   CRC = CRC XOR polynomial
   offset = concatentated tap bits of CRC
   $F_x$(pixel) = scaled offset
   barrel shift left CRC until least significant bit is a "1"
next_pixel This type of process can be used to generate the x-axis offsets as well as the y-axis offsets. Preferably, different seed values are used for x-axis offsets and y-axis offsets to provide a more random and non-uniform distribution of the sensors.

For example, consider a two-dimensional CCD array which is 10.46 mm wide having 754 sensor columns, and 3.38 mm tall with 244 sensor rows, with each sensor being 6.0 μm square (e.g. one-half of a sensor array for a standard 780 by 488 sensor array). In this case, a traditional uniformly spaced two-dimensional array would have the columns of sensors spaced uniformly at approximately 14 μm apart, and the rows are uniformly spaced at the same 14 μm. For the purposes of this example, also assume that the minimum spacing between adjacent sensors is 4 μm 2.0 μm to maintain a desired level of anti-blooming isolation. For non-square sensors and arrays in which row-to-row spacing and column-to-column spacing are not equivalent, different values of these geometries may be accommodated.

To realize a two-dimensional array of similar resolution (e.g. same number of pixels where N=754*244=183,976), a pseudo-random non-uniform number function (PSNUF) is defined using an 8-bit wide CRC ($b_7b_6b_5b_4b_3b_2b_1b_0$ with $b_7$ being the most significant bit) seed value of b'11010010 (h'D2) for the x-axis offset, a seed value of b'10110111 (h'B7) for the y-axis offset, and an XOR polynomial of b'10011011 (h'9B), where b' denotes binary notation and h' denote hexadecimal notation.

Further, the offset values in this practical example may be determined by "tapping" and concatenating $b_6b_4b_3b_1$ from the CRC value in the $n^{th}$ iteration for the sensor n to produce a 4-bit offset value ranging non-uniformly between and including 0 and 15 in decimal notation. In this example, we may use offset values 0 through 7 to represent left and down offsets from the standard grid, and values 8 through 15 to represent right and up offsets from the standard grid. Alternatively, another bit from the CRC could be tapped as a sign bit, with left/down offsets being negative and right/up being positive, etc.

Finally, the offset values are scaled to fit the maximum allowable offset range. In this example, if the sensor fabrication process requires a minimum spacing of 2.0 μm to maintain a desired level of anti-blooming isolation, the variance from uniform center spacing which is allowable in this situation is 14 μm less 6 μm less 2 μm, or 6 μm. So, the scaling process of Table 2 can be employed to determine the physical offset of a particular sensor.

TABLE 2

Example Offset Scaling Process

If 0 ≦ offset ≦ 7 then
   direction = left or down
   offset_distance = (offset/8) * $P_{offset\_max}$
else
   direction = right or up
   offset_distance = [(offset − 7)/8] * $P_{offset\_max}$
endif So, in this example, the first few x-axis offset values given the x-axis seed value, polynomial and tap bits, would be 10, 7, 9, 13, 9, 7, 15, etc., for the first, second, third, etc., sensors. After scaling, the physical x-axis offsets would be right 2.25 μm, left 5.25 μm, right 1.5 μm, right 4.5 μm, etc., for the first, second, third, etc., sensors.

For the y-axis offset values, the first few offset values (using the y-axis seed value) would be 2, 15, 11, 1, 3, 11, 4, 7, etc., for the first, second, third, etc., sensors, which scales to down 1.5 μm, up 6 μm, up 3 μm, down 0.75 μm, down 2.25 μm, etc.

Employing such a distribution function, a new two-dimensional array is preferably fabricated with the non-uniformly spaced sensors according to the non-uniform functions $F_x$ and $F_y$, instead of the uniform spacing of prior art sensor arrays. This is preferably done in the silicon design and layout, such as the phase of design of a CCD sensor. This allows for the manufactured sensor to incorporate the sensors with the x-axis spacing of the function $F_x$ and y-axis spacing of the function $F_y$, such that when it is used for imaging, moiré patterns will not form in the image.

Figure 7:
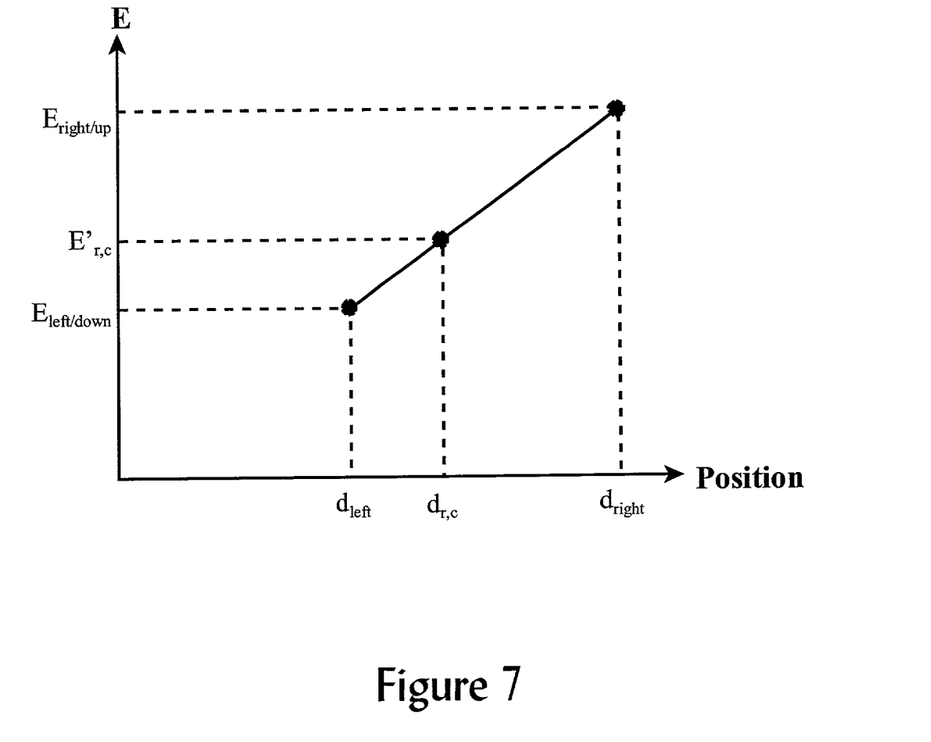
FIG. 7 graphically depicts the interpolation process of the preferred embodiment.

After the image sampling is complete (or concurrently with data sample collection), a linear interpolation may be performed between each non-uniformly spaced data sample to create synthesized data values for a two-dimensional uniformly-spaced data set. For example, as shown in FIG. 7, for a pixel at column n in a given row in a uniformly spaced data set (68), the closest surrounding data values from the non-uniformly spaced data set (64) may be used to calculate its value using linear interpolation as such:

$$E_n = \{(d_{left}/d_{left} + d_{right}) \cdot (E_{right} - E_{left})\} + E_{left}$$

where $E_n$ is the data value (energy, brightness, etc.) for the interpolated pixel on the given row, $d_{left}$ is the distance from the interpolated pixel to the closest actual data sample to the left (in the x-axis) and $E_{left}$ is the data sample value of that left neighbor; $d_{right}$ is the distance from the interpolated pixel to the closest actual data sample to the right (in the x-axis) and $E_{right}$ is the data sample value of that right neighbor. This produces a linearly interpolated value along the x-axis only, which is sufficient for many applications. In some applications, however, a nonlinear interpolation may be in order (e.g. when using sensors with a nonlinear sampling characteristic), and interpolation considering adjacent row data samples in the y-axis (e.g. above and below) may be employed.

So, an array of evenly spaced data samples (68) for c=1 to C columns and for r=1 to R rows, is preferably generated from the dithered data set (64), which can then be readily processed by common image compression and decompression technologies such as JPEG and MPEG utilities.

By employing the spacing technique of the sensors in the two-dimensional sensor array, a two-dimensional image data set which is free of inherent sensor spacing frequencies can be obtained which avoids the creation of moiré patterns in the first place.

According to an advanced realization of the invention, each non-uniformly spaced sensor array is assigned a reference identifier which is associated with a particular distribution function and seed values. In this way, a sensor manufacturer may produce a number of sensors having the same distribution pattern, and users of those arrays may interpret the data according to the manufacturer's specification of the distribution function. For the two-dimensional array of the previous example, the seed values could be combined with the polynomial value(s) to identify its distribution scheme, such as .D29B-B79B.

It is further recommended that data files containing samples from such arrays and sampling processes be identified, either within the file (e.g. a header area) or in naming convention, so that other processes may properly identify the distribution function of the sample data.

Further, industry consortiums could determine standards for distribution functions such that multiple manufacturers could produce "compatible", equivalent or interchangeable sensor arrays and data files.

While certain details of a preferred embodiment have been disclosed, and certain examples have been given to illustrate the invention in a more understandable manner, it will be recognized by those skilled in the art that the spirit and scope of the present invention is not limited to these examples and embodiment details. For example, certain terms including x-axis, y-axis, row, column, left, right, above and below, have been adopted to give a frame of reference. These terms, however, should not be interpreted in a limiting manner, as other terms such as horizontal/vertical, radial/angular, north/south/east/west, etc., can be used to describe the invention in other frames of reference.

Further, the invention may be employed for a wide range of information gathering and imaging applications, not just photographic and visible spectrum imaging, such as magnetic resonance imaging, radar and sonar imaging, etc. Therefore, the scope of the present invention should be determined by the following claims.

What is claimed is:

1. A method of producing a two-dimensional sensor array for imaging, comprising the steps of:
   determining a plurality of sensor positions, each position having a spacing in a first axis from a datum point according to a first non-uniform predictable deterministic distribution schema, and each position having a spacing in a second axis from said datum point according to a second predictable deterministic non-uniform distribution schema;
   providing a two-dimensional array of sensors, each sensor being positioned on said array according to the determined positions in said first and second axes; and
   providing a means for sampling said sensors such that a two-dimensional imaging sensor array having non-uniform sensor distribution is realized.

2. The method as set forth in claim 1 wherein said first schema comprises a pseudo-random schema.

3. The method as set forth in claim 1 wherein said first schema comprises a nonlinear polynomial schema.

4. The method as set forth in claim 1 further comprising the step of assigning one or more reference identifiers to said first and second non-uniform distribution schema.

5. The method as set forth in claim 1 wherein said second schema comprises a pseudo-random schema.

6. The method as set forth in claim 1 wherein said second schema comprises a nonlinear polynomial schema.

7. The method as set forth in claim 1 further comprising the steps of:
   creating a dithered set of data samples by sampling said non-uniformly spaced sensors, said dithered set of data samples representing an image; and
   performing interpolation to synthesize a set of data samples representing uniformly spaced data samples from said dithered set of data samples, said uniformiy spaced data samples representing said image according to uniformly distributed sensors.

8. The method as set forth in claim 7 wherein said step of performing interpolation to synthesize a set of data samples representing uniformly spaced data samples comprises performing linear interpolation.

9. A computer readable medium encoded with software for creating a synthesized uniformly-spaced data set from a dithered data set in an imaging system, said software performing the steps of:
   receiving a dithered set of data samples, said dithered set of data samples representing an image sampled by a plurality of sensors, wherein said sensors are positioned positions with a spacing in a first axis from a datum point according to a first non-uniform predictable deterministic distribution schema, and each sensor having a position spacing in a second axis from said datum point according to a second predictable deterministic non-uniform distribution schema; and performing interpolation to synthesize a set of data samples representing uniformly spaced data samples from said dithered set of data samples, said uniformly spaced data samples representing said image according to uniformly distributed sensors.

10. The computer readable medium as set forth in claim 9 wherein said software for performing interpolation comprises software for performing linear interpolation.

11. The computer readable medium as set forth in claim 9 further comprising software for performing the step of receiving a reference identifier associated with distribution schema of said dithered data set, and wherein said software for performing interpolation comprises software for performing interpolation based upon said distribution schema.

12. A digital imaging system comprising:

a sensor array means, said sensor array having a set of sensors arranged in first axis in a non-uniform predictable deterministic manner according to a first schema and in a second axis in a non-uniform predictable deterministic manner according to a second schema;

a sampling means for sampling said sensors; and a dithered data set creation means for storing data samples from said sampling means.

13. The digital imaging system as set forth in claim 12 wherein said sensors of said sensor array means are arranged in said first axis according to a pseudo-random schema.

14. The digital imaging system as set forth in claim 12 wherein said sensors of said sensor array means are arranged in said first axis according to a nonlinear polynomial schema.

15. The digital imaging system as set forth in claim 12 wherein said sensors of said sensor array means are arranged in said second axis according to a pseudo-random schema.

16. The digital imaging system as set forth in claim 12 wherein said sensors of said sensor array means are arranged in said second axis according to a polynomial schema.

17. The digital imaging system as set forth in claim 12 further comprising an interpolation means for synthesizing a uniformly-spaced data sample set from said dithered data sample set.

18. The digital imaging system as set forth in claim 17 wherein said interpolation means comprises a linear interpolation means.

19. The digital imaging system as set forth in claim 17 further comprising a means for receiving an reference identifier associated with said first and second distribution schema and selecting an interpolation means according to said first and second distribution schema.

* * * * *